Nov. 3, 1931.  C. W. VAN RANST  1,830,494
FAN MOUNTING FOR FRONT WHEEL DRIVE AUTOMOBILES
Filed March 9, 1929  3 Sheets-Sheet 1

Inventor
Cornelius W. Van Ranst
By Arthur Wm Nelson
Attorney.

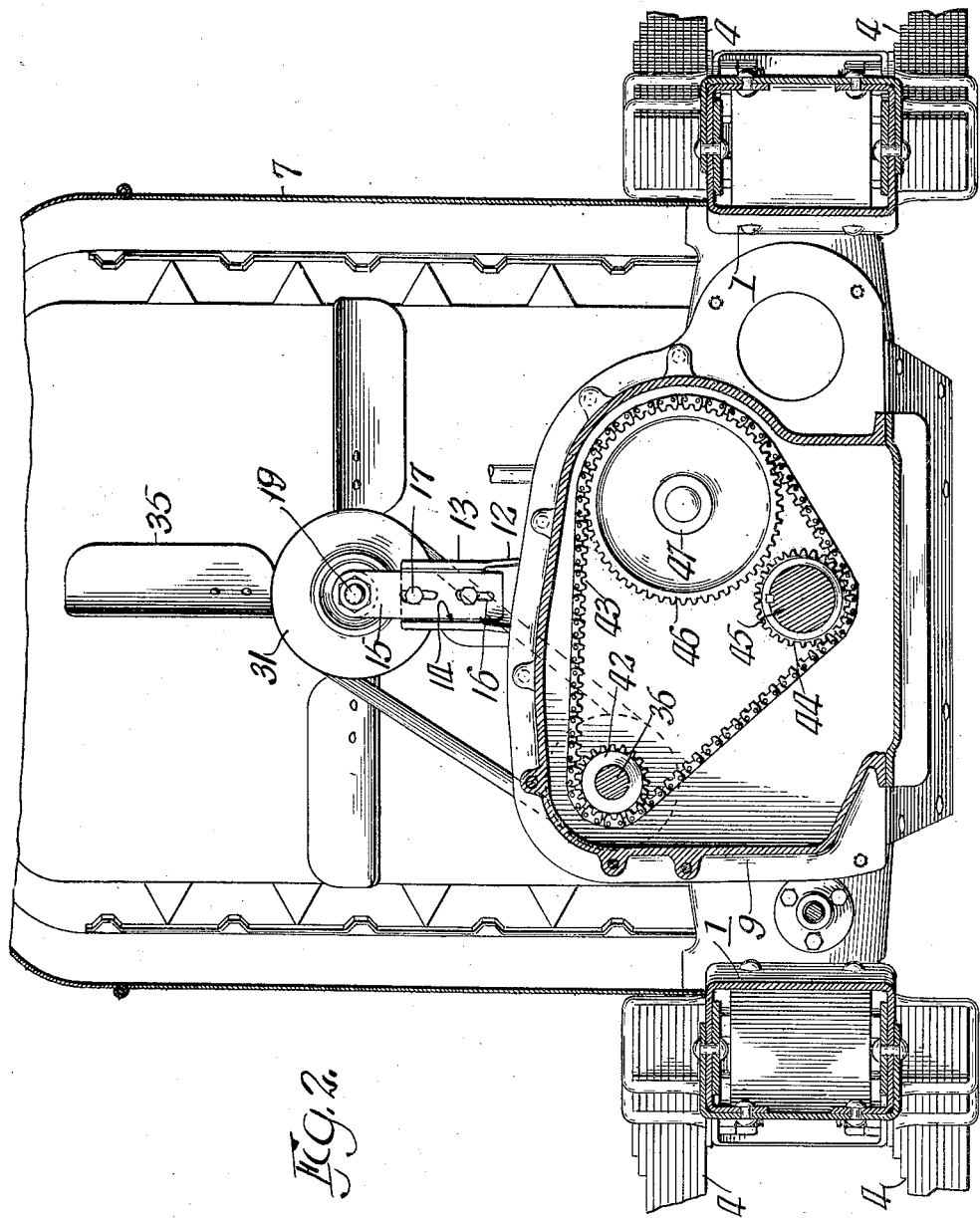

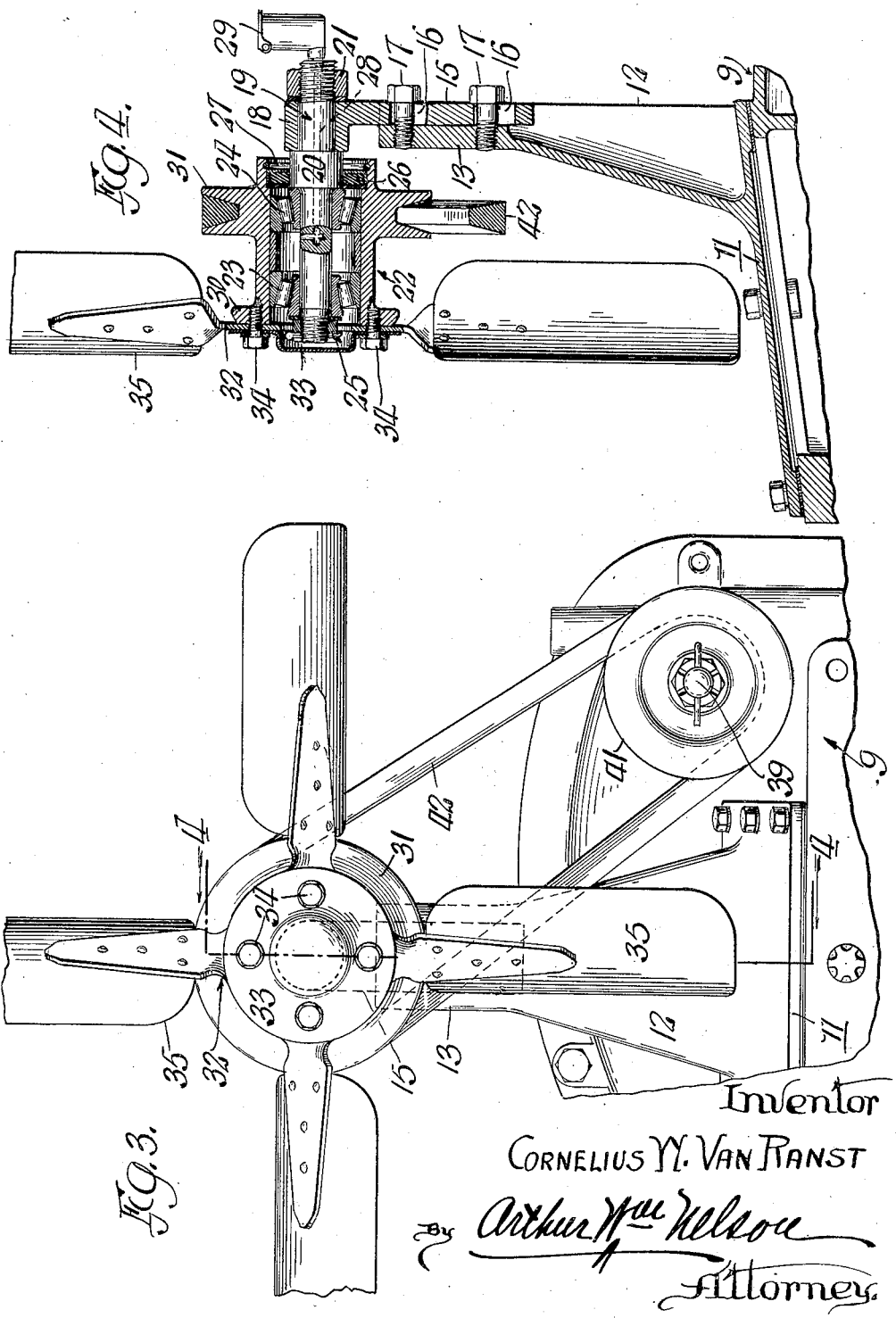

Patented Nov. 3, 1931

1,830,494

UNITED STATES PATENT OFFICE

CORNELIUS W. VAN RANST, OF AUBURN, INDIANA, ASSIGNOR, BY MESNE ASSIGNMENTS, TO MANNING & CO., OF CHICAGO, ILLINOIS, A CORPORATION OF ILLINOIS

FAN MOUNTING FOR FRONT WHEEL DRIVE AUTOMOBILES

Application filed March 9, 1929. Serial No. 345,797.

This invention relates to improvements in fan mountings for front wheel drive automobiles and it consists of the matters hereinafter described and more particularly pointed out in the appended claims.

The primary object of the invention is to provide an improved arrangement of parts whereby the fan associated with the radiator of a front wheel drive automobile may be mounted in a position most efficient for its intended purpose as well as in a position making it most convenient and accessible for inspection, adjustment and lubrication.

Another object of the invention is to provide such an arrangement of parts which reduces the required number thereof to a minimum and readily permits the driving of the fan from an accessory shaft on the engine.

These objects of the invention, as well as others, together with the many advantages thereof, will more fully appear as I proceed with my specification.

In the drawings:—

Fig. 2 is a transverse vertical sectional view through the same as taken on the line 2—2 of Fig. 1.

Fig. 3 is a view in front end elevation of the fan and associated parts.

Fig. 4 is a vertical sectional view as taken on the line 4—4 of Fig. 3.

Figure 1:
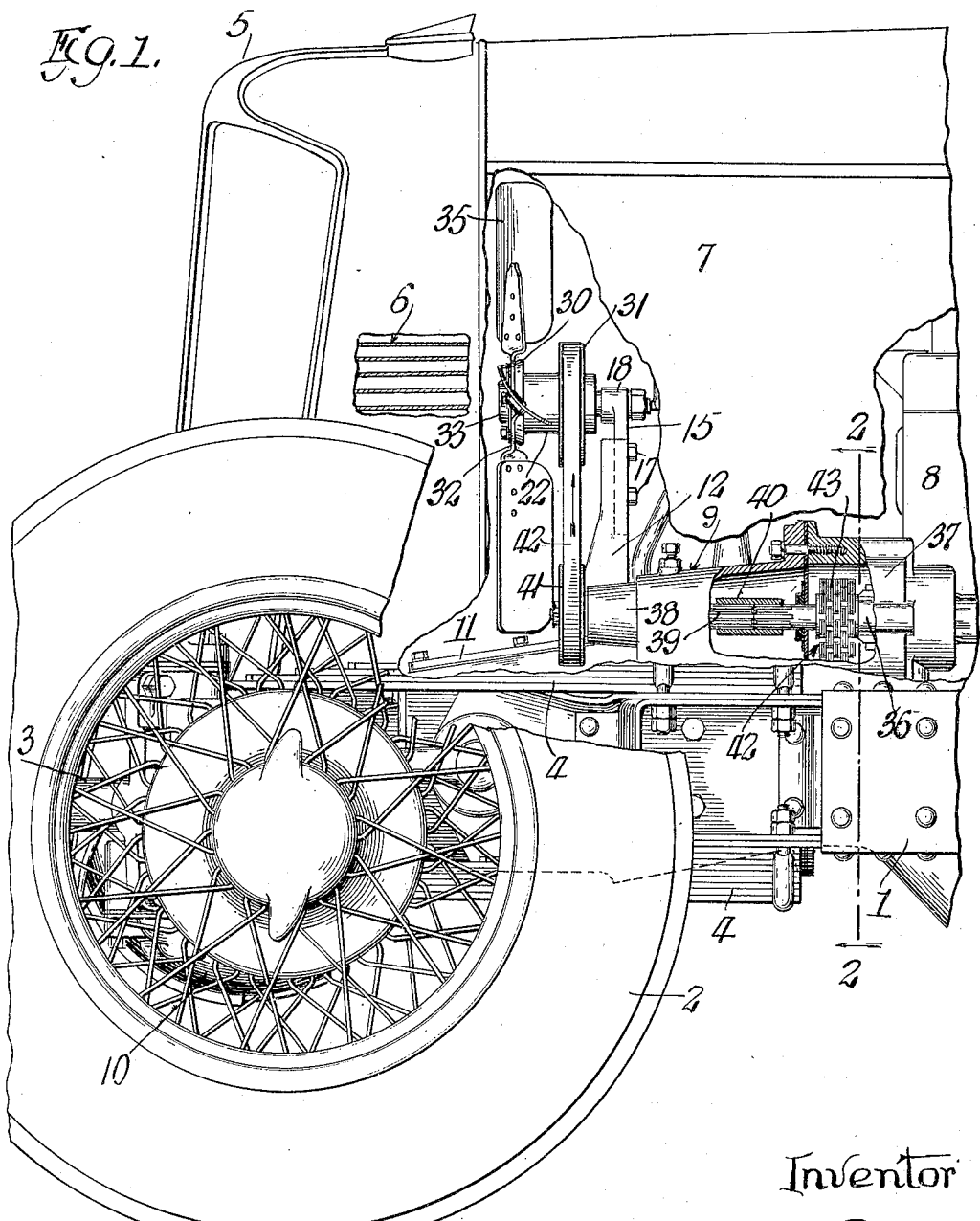
Fig. 1 is a view in side elevation of the forward end of a front wheel drive automobile embodying my invention, with parts broken away to more clearly disclose the several parts thereof.

Referring now in detail to that embodiment of the invention, 1 indicates one of the side members of the chassis, 2 indicates one of the front and driven wheels of the automobile, 3 indicates the front axle to which the front wheels are operatively connected and 4 indicates the leaf spring members of a pair of springs operatively connecting the front ends of the chassis members 1 with said front axle.

5 indicates the shell of the radiator which includes a core 6 and to the rear of said shell is located the hood 7. The engine 8 which is suitably supported from the chassis side members is located beneath the hood, a substantial distance to the rear of said shell. To the front end of said engine is secured the transmission casing 9 and to the front end of said transmission is secured the differential casing 10. The transmission casing which is open at its top, is there provided with a cover plate 11 bolted to said casing to give accessibility to the usual change speed gearing disposed with said casing.

The rear end of said cover plate is provided, on substantially its median line, with an integral, upright standard 12 terminating in a head 13, having a vertically disposed groove 14 in its rear side. Seated in said groove is the bottom end of a post or extension 15 having a pair of longitudinal slots 16—16 therein through which bolts 17 extend to be screw threaded into the head of the standard. By means of this bolt and slot construction, a vertical adjustment of the post on the standard within certain limits is possible, the post being secured in the desired adjusted position by tightening up the bolts 17.

The top end of the post 15 is provided with a horizontally disposed, tubular boss 18, extending longitudinally of the automobile as a whole. In said boss is fixed a non-rotative shaft or stud 19. This shaft which is exteriorly threaded at its rear end is provided with an enlarged annular shoulder part 20 which when a nut 21 is screwed upon the rear end of said shaft, is drawn snugly up against the front end of said boss to securely hold the shaft in position. That part of said shaft forwardly of said shoulder is reduced in diameter to form a spindle 21 upon which the fan as a whole is journalled.

22 indicates a tubular pulley hub member engaged upon the spindle through the agency of a pair of longitudinally spaced front and rear antifriction bearings 23 and 24 respectively, as best shown in Fig. 4, a nut 25 being threaded upon the front end of the spindle to hold the bearings and pulley hub in position upon the spindle. In the hub, to the rear of the bearing member 24 is located a felt gasket 26 secured in place by a spring locking ring 27, which gasket bears upon the shoulder 20 in a manner preventing the entrance of dust to the bearings. The spindle is provided with a longitudinal lubricant duct 28 that opens at its front end through the top side of the spindle between said bearing members, the rear end of said duct having screwed thereinto and oil cup or like device 29.

The front end of said hub is provided with an outwardly extending, radial flange 30 and near the rear end of said hub is provided a pair of spaced annular flanges forming a belt pulley 31 integral with the hub. 32 indicates a centrally apertured spider located at the front end of the hub and associated with said spider is a cap 33 which closes the front end of the hub, bolts 34 passing through the cap and spider and into the flange 30 to secure said cap and spider to the hub.

The spider 32 includes a plurality of radially disposed arms, each twisted to impart the desired pitch thereto and riveted to each arm is a fan blade 35.

At the front end of the engine on the left hand side thereof is located a longitudinally extending shaft 36 which is employed to drive an accessory to the engine such as for instance, the generator and water circulating pump (not shown).

This shaft is journalled at one end in a housing 37 on the engine and terminates at its other and splined end, adjacent the transmission casing in a housing 38 carried by said casing. In said housing 38, in axial alignment with the shaft 36 is journalled a second shaft 39 splined at its rear end to be coupled by an interiorly splined sleeve 40 with the splined end of the shaft 36, which sleeve is secured preferably to the splined end of the shaft 36. Fixed to the forward end of the shaft 39 is a pulley 41 in line with the pulley 31, and about said pulleys a belt 42 is trained. By means of the structure above described, the shafts 36 and 39 become automatically coupled together, when the transmission casing is operatively connected to the associated end of the engine, in the assembly of the various parts of the automobile.

On the shaft 36 within the housing 37 is a sprocket 42 driven by a silent chain 43 from a like sprocket 44 on the engine crank shaft 45 said chain also meshing with and driving a sprocket 46 on a shaft 47 forming a part of the transmission.

Thus when the engine 8 is running, it is apparent that the fan is driven in the proper direction to cause a suction draft through the radiator core to cool the circulating water therein.

The fan mounting and drive described, has many advantages in a front drive automobile, because it not only locates the fan in the most desirable position for efficient operation but it reduces the number of parts necessary to a minimum. Again with the fan mounted on the cover plate of the transmission casing, a stable and non-vibratory support is afforded therefor. Furthermore, when access is desired to the transmission gearing and the cover plate is removed for that purpose, the fan is removed therewith, thus providing ample room above the casing to do such work on the transmission as is necessary.

While in describing my invention I have referred in detail to the form, arrangement and construction of the various parts thereof, the same is to be considered merely as the preferred embodiment of the invention, so that I do not wish to be limited thereto except as may be specifically set forth in the appended claims.

I claim as my invention:—

1. In a front drive automobile, a radiator, an engine spaced to the rear thereof, a transmission casing and a differential casing arranged forwardly of the engine, a cover plate on said transmission casing and a fan supported on said cover plate in operative relation with respect to the radiator and driven from the engine.

2. In a front drive automobile, a radiator, an engine spaced to the rear thereof, a transmission casing and a differential casing arranged forwardly of the engine, a cover plate for one of said casings including an upright member and a fan supported by said upright member in operative relation with respect to the radiator and driven from the engine.

3. In a front drive automobile, a radiator, an engine spaced to the rear thereof, a transmission casing and a differential casing arranged forwardly of the engine, a cover plate for one of said casings including an upright member, a post securely fixed to said upright member and a fan supported by said post in operative relation with respect to the radiator and driven from the engine.

4. In a front drive automobile, a radiator, an engine spaced to the rear thereof and including a driven shaft at one side thereof, a transmission casing and a differential casing arranged forwardly of the engine, a fan located in operative position with respect to the radiator and supported by one of said casings and means driving said fan from said shaft.

5. In a front drive automobile, a radiator, an engine spaced to the rear thereof and including a driven shaft at one side thereof, a transmission casing and a differential casing arranged forwardly of the engine, a cover removably mounted on one of said casings, a fan located in operative position with respect to the radiator and supported on said cover and means for driving said fan from said shaft.

6. In a front drive automobile, a radiator, a transmission casing disposed to the rear of said radiator, a cover plate on said casing and a driven fan supported from said cover plate in operative relation with respect to said radiator.

7. In a front drive automobile, a radiator, an engine spaced to the rear of said radiator a transmission casing disposed to the rear of the radiator and including a driven accessory shaft at one side thereof and terminating adjacent said transmission casing, a second shaft in the transmission casing in line with the first mentioned shaft, a means coupling adjacent ends of said shafts together, a fan positioned rearwardly of but adjacent the radiator and means driving said fan from the forward end of said second shaft.

In testimony whereof, I have hereunto set my hand, this 6th day of March, 1929.

CORNELIUS W. VAN RANST.